Nov. 26, 1940.    R. B. ARNOLD    2,222,598
METHOD AND APPARATUS FOR DISTRIBUTING PARASITICIDES
Filed June 3, 1939    8 Sheets-Sheet 2

INVENTOR
Robert B. Arnold
BY
ATTORNEYS

Nov. 26, 1940.  R. B. ARNOLD  2,222,598
METHOD AND APPARATUS FOR DISTRIBUTING PARASITICIDES
Filed June 3, 1939    8 Sheets-Sheet 6

Nov. 26, 1940.  R. B. ARNOLD  2,222,598
METHOD AND APPARATUS FOR DISTRIBUTING PARASITICIDES
Filed June 3, 1939  8 Sheets-Sheet 8

INVENTOR
Robert B. Arnold
BY
ATTORNEYS

Patented Nov. 26, 1940

2,222,598

UNITED STATES PATENT OFFICE 2,222,598

METHOD AND APPARATUS FOR DISTRIBUTING PARASITICIDES

Robert B. Arnold, Stonewall Courts, Va., assignor to Tobacco By-Products and Chemical Corporation, Louisville, Ky., a corporation of Delaware Application June 3, 1939, Serial No. 277,147

18 Claims. (Cl. 43—148)

This invention relates to methods of and apparatus for the application of parasiticides to field plants, as distinguished from plants growing in greenhouses or other enclosed spaces.

Broadly considered the invention may be carried out when employing any parasiticidal dusts or fumes which will check or exterminate plant fungi, bacteria, or insects.

More specifically considered the method and apparatus are particularly suitable for the application, to field plants, of parasiticides of a volatilizable nature such as nicotine, neonicotine and anabasine where the volatilizable parasiticide is converted into a gaseous state and then used to form a fumigating atmosphere in contact with the plants, or to form a fresh parasiticidal dust which is then brought into contact with the plants. Furthermore, both such methods may be employed simultaneously.

In the description hereinafter given the method and apparatus constituting the invention will be set forth in connection with nicotine as the volatilizable parasiticide, but it is to be understood that other parasiticides resembling nicotine, such, for example, as neonicotine and anabasine may be substituted for the nicotine.

The lethal effect on plant parasites of fumes containing nicotine as the parasiticide, is dependent partly on the concentration of the nicotine in the fumes and partly on the period of exposure of the parasites thereto. Hence, an increase in the nicotine concentration permits a decrease in the period of treatment. In fact, fumes of appropriate nicotine strength will kill the parasites almost instantly, and where fumes of sufficient nicotine concentration can be obtained and maintained around the plant the results are highly satisfactory against insects sensitive to nicotine because the fumes readily spread to reach all parts of the plant and thereby come in contact with all the parasites on such plants. This is the great advantage of fumigation as compared with spraying or dusting. When either the concentration of nicotine in the fumes or the period of exposure of the parasites to the fumes is inadequate, some of the parasites may be killed and the others adversely affected but in most cases a sufficient proportion will revive when the fumes are removed and thereby reinfest the plants, thus rendering the treatment ineffective and uneconomical. For commercial practicability it is necessary that all or substantially all of the parasites be killed.

Nicotine fume treatment has therefore been specially effective in enclosed spaces such as green houses and the like where appreciable inflow of the outside atmosphere is readily avoided and there is plenty of time to build up a strong concentration of the nicotine in the fumes. Entirely different problems are presented in the treatment of plants growing in the open. Such treatment is carried out beneath movable tents, canopies or aprons and commercial requirements make it necessary to move such temporary enclosures from one treatment location to another as rapidly as possible to avoid prohibitive expense. In the treatment of field crops it is usual to employ a continuously movable enclosure such as a canopy or apron drawn behind a truck and covering a substantial area of relatively low-growing plants, a system that is especially adapted for the destruction of the pea Aphis and similar parasites. With such an arrangement it has heretofore been necessary, in order to obtain the requisite duration of treatment, to employ relatively long and cumbersome canopies or aprons with consequent difficulties in supporting and manipulating the aprons as well as an increased tendency to damage the plants. Apparatus of this type furthermore is subject to loss of fumes which escape beneath the apron, the introduction of the fumes into the space beneath the apron creating a pressure that tends to increase such leakage.

A general purpose of the invention is to provide an improved method and apparatus which will insure the application to plants in the field of fumes having a concentration of nicotine or other parasiticides substantially higher than has been practicably obtainable by prior systems. This result is attained by recirculating the fumes or dust charged air between the space beneath the apron and a supply source such a blower, and adding sufficient nicotine dust or the like to the circulating stream to maintain the desired high fume concentration. In this way the pressure beneath the apron is reduced or maintained more nearly normal, as compared with prior methods, and thereby there is a corresponding decrease in the tendency to leakage. Furthermore, such air as may leak inwardly into the space beneath the apron will be withdrawn from such space with the circulating stream and charged with fumes before return to the zone of action.

When the system is employed with a continuously traveling canopy the fumes are advantageously discharged beneath the forward part of the canopy where the tendency to inward leakage of air is greater, and are withdrawn at a point toward the rear of the canopy where there is a greater tendency to outward leakage of the fumes. The recirculation system is likewise arranged to improve the uniform dissemination of the fumes around the plants, creating a current beneath the anopy which may readily be directed into and through the plant growth, increasing the thoroughness with which the fumes reach the lower sides and more remote portions of the plant surfaces.

While the nicotine fumes alone are effective, their action is assisted when the nicotine is carried by finely divided material which will adhere to the plants. A feature of the invention is the provision of a system by which the nicotine is efficiently applied to the plants in this manner. This system is advantageously combined with the fume treatment and recirculation system, the latter serving to avoid waste of powder that does not adhere to the plants.

Another characteristic of the invention, designed to enhance the effective strength of the nicotine at the point of application, includes the incorporation of the nicotine with a carrier such as lime immediately before application to the plants. Specifically, the nicotine is advantageously combined with the pulverized lime in the space beneath the apron or other enclosure immediately prior to its application to the plants. The invention includes an improved arrangement for combining the nicotine and the carrier powder and distributing the resulting nicotine dust through the plant growth. It has been found that with this system highly lethal nicotine concentrations beneath the apron can be obtained, and that the nascent nicotine dust is especially effective.

The nicotine in liquid form is advantageously gasified by heat before use. In the best embodiment now contemplated the nicotine is applied to the carrier powder in heated gaseous form and novel means is provided for this purpose. In this embodiment the nicotine is conveniently gasified by heat from the exhaust of an internal combustion engine, and a feature of the invention is the arrangement of the fumigating apparatus as a separate unit, adapted for mounting on a tractive vehicle such as a truck, and including a separate engine which is advantageously employed to operate a recirculation blower and to provide the necessary exhaust heat for gasifying the nicotine. This construction permits better control of the system and, in particular, improved gasification of the nicotine as compared to an arrangement employing heat from the truck engine exhaust for the purpose, since the heat generated by the independent engine is not dependent on truck speed.

It has been found that when nicotine of a high degree of purity is employed, a tendency toward decomposition when the nicotine is gasified is counteracted by the incorporation of a suitable liquid hydrocarbon having a boiling point below that of nicotine. This system is disclosed in the patent to Arnold, No. 2,120,225 and in Arnold application Serial No. 121,447, of which this application is a continuation in part. The invention likewise includes the combination of the hydrocarbon and nicotine with the dusting powder.

The system set forth herein permits the effective use of a much shorter apron, due to the higher concentration of effective nicotine and the more efficient distribution thereof, providing a lethal effect in a much shorter time than that required by previous systems. Furthermore, the incorporation of the nicotine in dust adherent to the plants provides insecticidal action after the apron has passed beyond the treated plants.

An improved arrangement for supporting a traveling canopy and for distributing the nicotine and powder beneath the canopy has been provided, and includes means for collapsing portions of the structure extending beyond the truck.

Other objects and advantages of the invention will appear from the following description considered in connection with the accompanying drawings in which Fig. 1 is a side elevation of the forward portion of a plant fumigating unit mounted on the rear part of an automobile truck body;

Fig. 1*a* is a similar view in continuation of Fig. 1 extending to the left thereof and showing the remaining rearward portion of the unit;

Fig. 2 is a rear elevation of the right hand half of said unit with the apron removed;

Fig. 2*a* is a similar elevation of the left hand half of the unit in continuation of Fig. 2, showing the apron in place;

Fig. 3 is a plan view of the arrangement shown in Fig. 1, omitting portions extending laterally beyond the truck;

Fig. 4 is a view similar to Fig. 1 with parts broken away and showing a modified mixing and distributing arrangement;

Fig. 5 is an enlarged elevation of the powder feeding system with parts broken away;

Fig. 6 is an enlarged detail of the recirculation system suction inlet, baffle and associated parts;

Fig. 7 is a longitudinal vertical sectional view through the nicotine supply tank and associated gauge;

Fig. 8 is a vertical section through the nicotine supply pump;

Fig. 9 is an enlarged side elevation showing one form of separate joint in the powder distributor;

Fig. 10 is an enlarged fragmentary end elevation of a distributor of the type employed in the construction shown in Figs. 1 and 4;

Fig. 11 is a view similar to Fig. 9 showing another arrangement for shifting the outer end portion of the powder distributor, including a hinge connection;

Fig. 12 is a transverse section through the distributor on line 12—12, Fig. 11, and Fig. 13 is a rear elevation of a modified form of unit including connections to a stationary canopy.

Apparatus embodying the invention includes in general an apron, means for supplying nicotine fumes to the space beneath the apron, a recirculating system, a nicotine supply, a nicotine gasifying arrangement and a powder feed apparatus. The illustrated embodiment is mounted on the rear portion of an automobile truck body 20 and includes a frame 21 of structural steel members resting on truck body 20 and carrying an internal combustion engine 22, a centrifugal blower 23 driven by the shaft of engine 22, a powder supply bin 24, a nicotine tank 25 and a nicotine supply pump 26.

The nicotine supply system includes a tank 25, (Fig. 7) mounted on frame 21 and provided with a screened filling funnel 27 closed by hinged cover 28, sight glass 29, drain cock 30 and supply pipe 31 connected to pump 26. This pump is advantageously of the type which supplies a fixed volume of liquid at each stroke, permitting accurate measurement of the nicotine. In the embodiment illustrated in detail in Fig. 8 the pump comprises a cylinder 32 having an inlet port 33 connected to nicotine supply pipe 31, and a discharge port 34. Piston 35 is reciprocated in cylinder 32 by suitable mechanism, such as piston rod 36 pivoted to piston 35 and to roller 37 which travels along a suitable edge cam 38. The track of cam 38 is generally square in contour and roller 37 is maintained in engagement with the track by a rocking frame 39 including arm 40 on which roller 37 is rotatably mounted and arm 41 carrying roller 42 engaging cam 38 at a point offset 135° around the axis of cam 38 so that roller 42 will engage a corner of the cam track when roller 37 is at the middle of one of the sides, and vice versa, this arrangement being known and adapted to produce positive outward and inward movement of roller 37 and parts connected thereto. Frame 39 is pivotally mounted on rock-shaft 54 carried by hollow casing 55 enclosing the drive mechanism described and is shown as unitary with cylinder 32.

A second piston 35a is reciprocably mounted in cylinder 32 and is yieldably held in predetermined position, as by spring 43 bearing against piston 35a and cap 44 threaded on the upper end of cylinder 32 and provided with a seat 45 engaged by flange 46 on piston 35a.

At the beginning of the feed stroke piston 35 is located below inlet port 33 and piston 35a below discharge port 34, with flange 46 resting on seat 45. The space between pistons 35 and 35a determines the volume of liquid fed at each stroke of the pump and may be varied by changing the lowermost position of piston 35a, readily accomplished in the illustrated construction by screwing cap 44 along cylinder 32 to the required point. The upward stroke of piston 35 will raise piston 35a against spring 43 by pressure of the liquid against piston 35a until discharge port 34 is cleared, the continued movement of piston 35 expelling the liquid through said port until the top of the stroke is reached. During the return stroke of piston 35 the upper piston 35a will first return to its place as determined by the position of seat 45, and continued movement of piston 35 will fill the cylinder with the requisite amount of liquid entering through port 33.

In view of the importance of measuring accurately the amount of nicotine supplied to the system, a convenient and practical arrangement for determining the amount fed by the pump is provided to facilitate accurate adjustment of the pump capacity. In this arrangement the pump discharge pipe 47 is connected through three-way cock 48 either to the nicotine feed line 49 or through connecting pipe 50 to a calibrated glass sight gauge 51 in which the rate at which the nicotine is fed by pump 26 can be observed as the gauge is filled by the pump, particularly in relation to the distance traveled by the truck when the pump 26 is driven from the truck wheel as hereinafter set forth. Connecting pipe 50 is provided with a three-way cock 52 connected to a discharge pipe 53 extending into tank 25, cock 52 being arranged so that the nicotine from pump 26 may be discharged either into gauge 51 or tank 25 and nicotine accumulated in gauge 51 may be drained into said tank.

Figure 8:
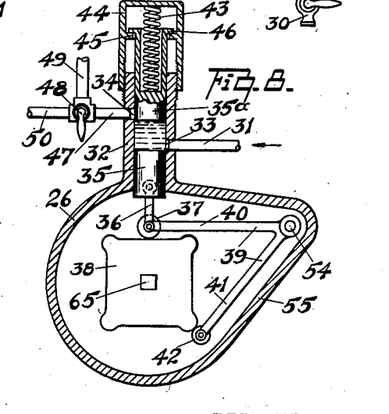

A suitable arrangement for driving pump 26 is provided so that in treating field crops the pump will be accurately actuated or controlled in conformity with the rate of truck travel to assure the application of the same quantity of fumigant to a given area regardless of variations in the speed of the truck. In the best embodiment of the invention this is accomplished by driving pump 26 from truck wheel 56. In the form illustrated the driving arrangement includes a pulley 57 mounted coaxially with wheel 56 on a tubular extension 58 bolted to the wheel. Belt 59 passes around wheel pulley 57 and drive pulley 60 mounted on driven shaft 61 suitably journaled on frame 21 and carrying drive pulley 62 which by means of belt 63 drives pump pulley 64 mounted on pump shaft 65 (Fig. 8) journaled in pump casing 55 and carrying cam 38 fixed thereto. A suitable clutch 66 operated by handle 67 may be interposed in shaft 61 between drive pulley 60 and the remaining pulleys on said shaft. Belt 59 is maintained at proper tension as by tension roller 68 bearing against the belt and mounted on arm 69 pivoted on shaft 61 and pressed toward belt 59 by tension spring 70 connected to the truck body 20 by bracket 71. A vertical V-shaped belt guard 72 is located in advance of and in alignment with belt 59 and is mounted on truck body 20 by bracket 73.

Suitable means is provided for distributing the nicotine to the area under treatment, this including means for gasifying the nicotine before application to the plant growth. Such gasification is best carried out under the conditions set forth in Arnold Patent 2,120,225 and Arnold application, Serial No. 121,447. In the best embodiment now contemplated and illustrated herein this is accomplished by utilizing the exhaust from internal combustion engine 22 to gasify the nicotine and propel the gaseous nicotine to a suitable distribution apparatus. In order to obtain the gasification of the nicotine it is necessary to heat the nicotine to a temperature above its boiling point, which in practice is in the neighborhood of 478° F., but depends somewhat upon the pressure at the point of vaporization. In order to obtain the proper conditions the engine exhaust 75, although it may be of the usual diameter, for example 1¼ inches, may have a portion, for example, about two or three feet of its length, enlarged in diameter, to serve as a vaporizing chamber. In usual practice this enlarged diameter may be 1½ inches. Pipe 75 is furthermore enclosed in a relatively heavy thermal insulating jacket 76, the pipe diameter and insulation being designed to produce the necessary temperature for nicotine gasification. Nicotine feed line 49 discharges the nicotine into exhaust pipe 75 at a point sufficiently spaced from the outlet of the latter pipe to assure complete nicotine gasification in the pipe. A suitable thermometer 77 is associated with pipe 75 toward its discharge end to permit ready observation of the temperature in the pipe as a guide to adjustment thereof, as by varying the speed of the engine, or retardation of the spark of engine 22, or supplying additional heat. Also the temperature attainable may be determined by the thickness and kind of insulation used for the jacket 76.

It is important in this invention to gasify the nicotine where it mixes with the exhaust gases as distinguished from suspensions of nicotine in gas below such temperature, sometimes referred to as vapor. The nicotine fumes referred to herein are in general composed predominately of nicotine in gaseous phase up to the point of discharge, becoming a finely dispersed vapor when discharged.

Pipe 75 discharges into a suitable nicotine distributor, comprising in general a pipe 78 extending transversely across the area to be treated and provided with a plurality of nozzles 79 arranged to provide a substantially continuous flow of nicotine across said area. In the best embodiment of the invention, the pipe 78 is arranged so that the lateral portions thereof extending beyond the truck body may be collapsed when not in use. A suitable construction for this purpose includes a central pipe section 80 connected to pipe 75 and connected by means of hangers 81 to the bed frame 21. Pipe section 80 communicates at its ends with lateral pipe sections 82 through swivel connections 83 arranged to permit sections 82 to be swung forwardly to positions in longitudinal alignment with the truck body 20.

A suitable arrangement is provided for recirculating the nicotine fumes. When the invention is applied to a continuously traveling unit this arrangement includes means for withdrawing the fumes from the rearward portion of the area under treatment and returning them to the forward portion of such area. In the construction illustrated a recirculation pipe system is connected to centrifugal blower 23 driven by engine 22 and includes a return pipe 84 having downwardly directed suction inlets 85 connected through cross pipe sections 86 to the rear section 87 of return pipe 84 which is laterally deflected and connects with the main body 88 of return pipe 84 extending along one side of the frame 21 to front pipe section 89 which extends transversely to the inlet of blower 23. The rear section 87 and end sections 86 of pipe 84 may conveniently be mounted on an extension frame 90 bolted to the main frame 21, and may be separable from main body 88 to permit the removal of portions of the unit extending substantially to the rear of truck body 20, if desired.

The recirculated fumes are fed to the treated area through feed pipe 93 extending rearwardly along frame 20 from the outlet of fan 23 and having a down-turned rear end section 94 discharging into a distributor 95 extending transversely across the area under treatment. Distributor 95 is of suitable contour and construction to provide a substantially uniform discharge of the fumes across the entire treated area and desirably comprises a suitable proportioned transverse passage 96 (Fig. 12) having a substantially continuous restricted discharge opening or slot 97 extending along the lower part of passage 96.

Figure 1:
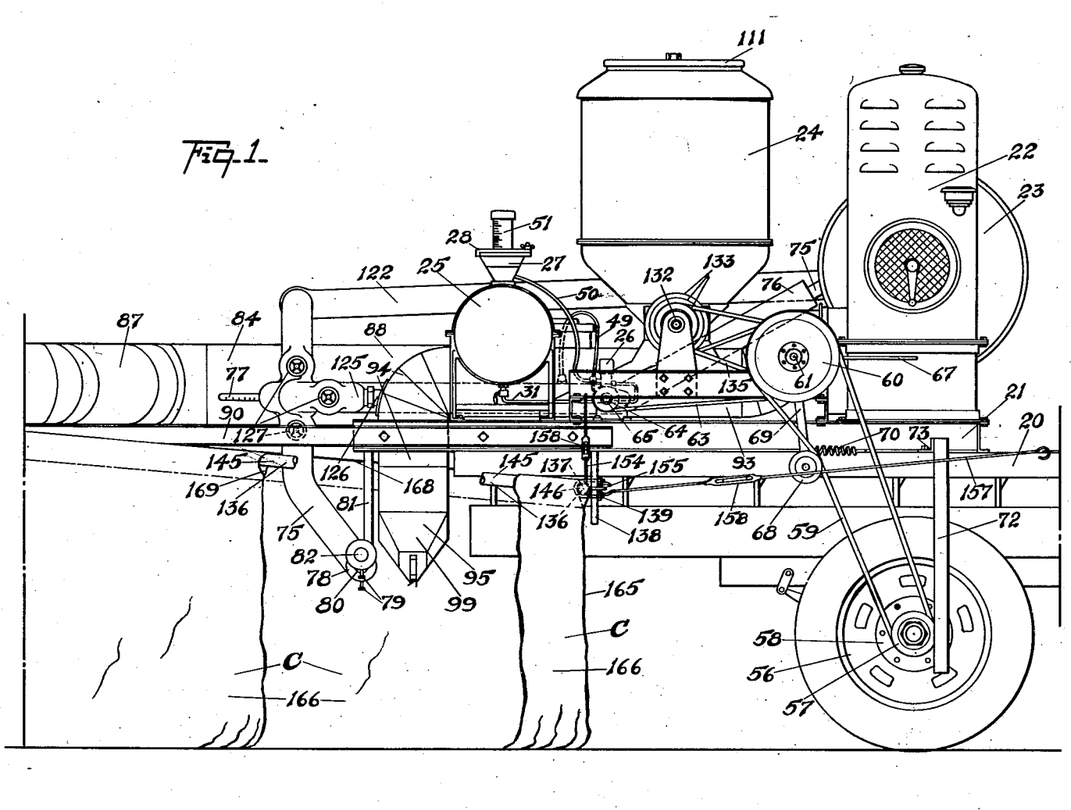
Figures 1A, 5, 6:
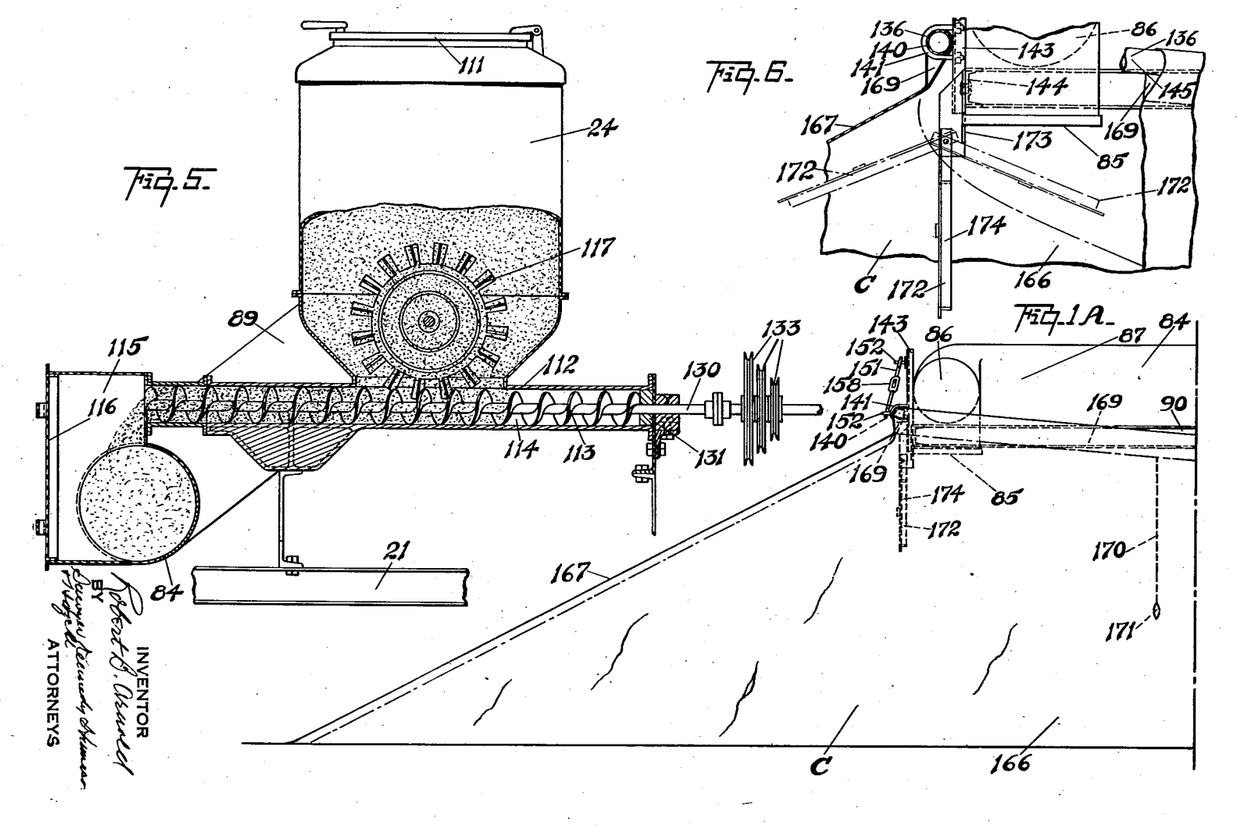
Figures 2, 12:
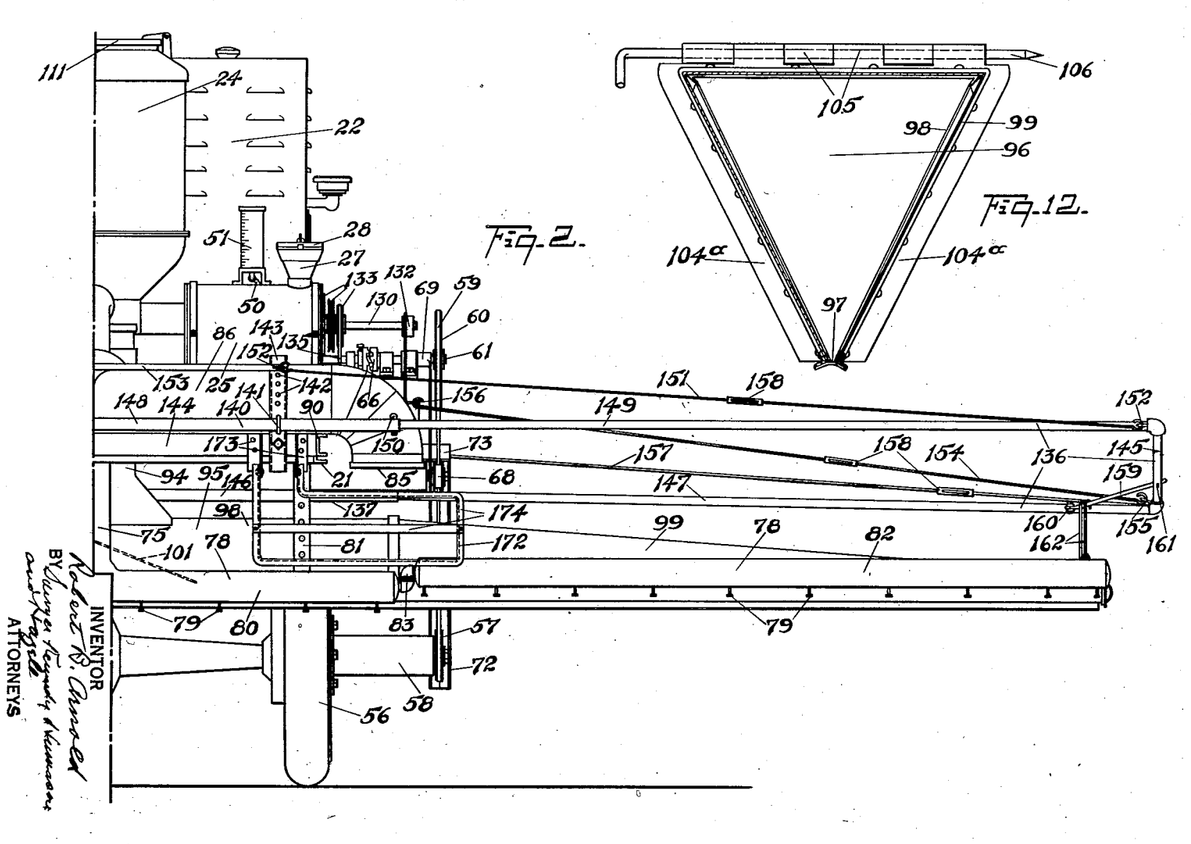
Figures 2A, 11:
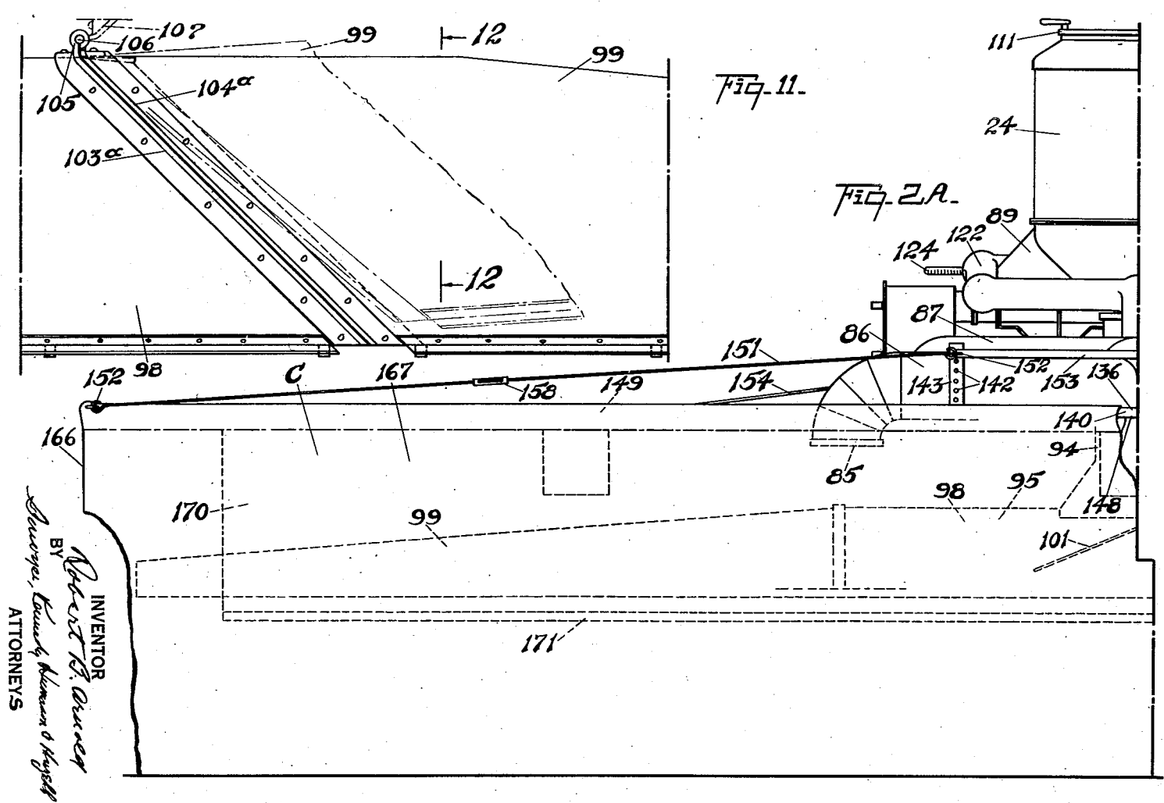

The portions of the distributor 95 extending laterally beyond truck body 20 are arranged so that they may be removed or collapsed when not in operation. In the arrangement illustrated distributor 95 includes a central section 98 communicating with end section 94 of feed pipe 93 and not substantially greater in total transverse length than the width of the truck body 20. Lateral sections 99 are shiftably connected to central section 98 and are reduced in cross section toward their outer ends to reduce the area of passage 96 in proportion to the rate of discharge of the fumes, thereby maintaining a uniform flow through outlet 97. Distributor 95 may be of hollow sheet metal construction with the lower portions of the side walls converging downwardly to outlet 97. Various contours may be employed, the constructions shown in Figs. 1–10 being generally pentagonal, while that illustrated in Figs. 11 and 12 is triangular, each including relatively flat walls defining passage 96 and converging toward the outer ends of the lateral sections 99.

Suitable baffles 101 in passage 96 in alignment with the discharge from section 94 of the feed pipe and extending downwardly and outwardly from the center line of said section, may be provided to assist in uniform distribution of the fumes and to prevent excessive discharge through that portion of the outlet 97 in alignment with said discharge.

Figure 9:
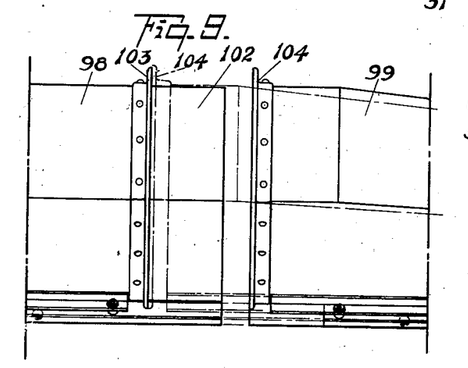

A suitable arrangement for disconnecting a lateral section 99 of the distributor from central section 98 is illustrated in detail in Fig. 9, and is of the telescoping type including a supporting extension 102 on section 98 slidably fitting snugly into the end of section 99 and provided with a peripheral flange 103a abutting against a similar flange 104a on the inner end of section 99 when the parts are in assembled position. Another arrangement is illustrated in Figs. 11 and 12, in which abutting ends of sections 98 and 99 are provided with registering diagonal peripheral flanges 104 connected at the top by hinge 105 provided with a removable pintle 106, the portion of the hinge connected to central section 98 being advantageously supported from frame 21 by bracket 107. Hinges 105 are located at opposite ends of the center portion 98 of the distributor in proper position to permit the lateral sections 99 to be swung upwardly without interference with other portions of the unit into substantially upright position and for this purpose are advantageously located slightly to the rear of the truck body 20.

A suitable arrangement is provided for introducing uniformly distributed powder or dust to the treated area, advantageously utilizing the recirculation system for this purpose. In the form illustrated and shown in detail in Fig. 5 the powder is stored in a suitable bin 24 provided with a hinged cover 111 and discharging into worm casing 112 which may be integral therewith, bin 24 and casing 112 being mounted on frame 21. Worm 113 rotatably mounted in passage 114 through casing 112 is operative to propel material passing from the interior of bin 24 along said passage into feed box 115 connected to the recirculation system and arranged to provide uniform feed of the powder to the current passing through said system. In the illustrated embodiment, feed box 115 extends around the outer half of the body section 84 of the return pipe which is cut away within the box to permit the powder discharged from passage 114 above the center of section 88 to fall directly into the current passing through said section. The outer face of box 115 is desirably provided with a removable face plate 116 for inspection purposes, and to permit the introduction of a suitable container, for example, a bucket, to catch the dust discharged from the bin for a given travel of the truck while the blower is shut down. By weighing this dust, the apparatus may be calibrated and adjusted to give the proper amount of discharge. A stirring wheel 117 may be mounted in bin 24 and rotated by engagement with worm 113 in known manner. With this arrangement the powder passes to blower 23 which assures thorough and uniform mixture of the powder with the recirculating current of gas and the fumes carried thereby.

Suitable means is provided for driving worm 113. In the illustrated embodiment worm shaft 130 is supported by journal 131 at the end of casing 112 and journal 132 mounted on the frame 21, and is driven from drive shaft 61 by a changeable speed connection. In the illustrated arrangement three pulleys 133 of progressively decreasing diameter are fixed to shaft 130 in alignment with three pulleys 134 of progressively increasing diameter mounted on drive shaft 61, all pairs of aligned pulleys having the same total diameter. Belt 135 may be placed around any selected pair of aligned pulleys 133, 134 for driving shaft 130, the arrangement providing three different speeds of worm 113 for the same speed of rotation of shaft 61.

A suitable arrangement is provided for combining the nicotine with the powder. This is advantageously accomplished by intermingling the discharge from distributor 95 carrying the powder with the discharge from nozzles 79 carrying the vaporized nicotine. For this purpose nozzles 79 and discharge openings 97 of distributor 95 are arranged in parallel relationship and juxtaposition so that the streams of vapor and dust are intermingled immediately below the space between the nozzles and outlet and above the plant growth to be treated. It has been found that with this arrangement the powder will take up a substantial proportion of the nicotine and will then pass immediately to the plant growth, eliminating any opportunity for decomposition of the nicotine before it reaches the zone of effective action.

Figures 4, 10:
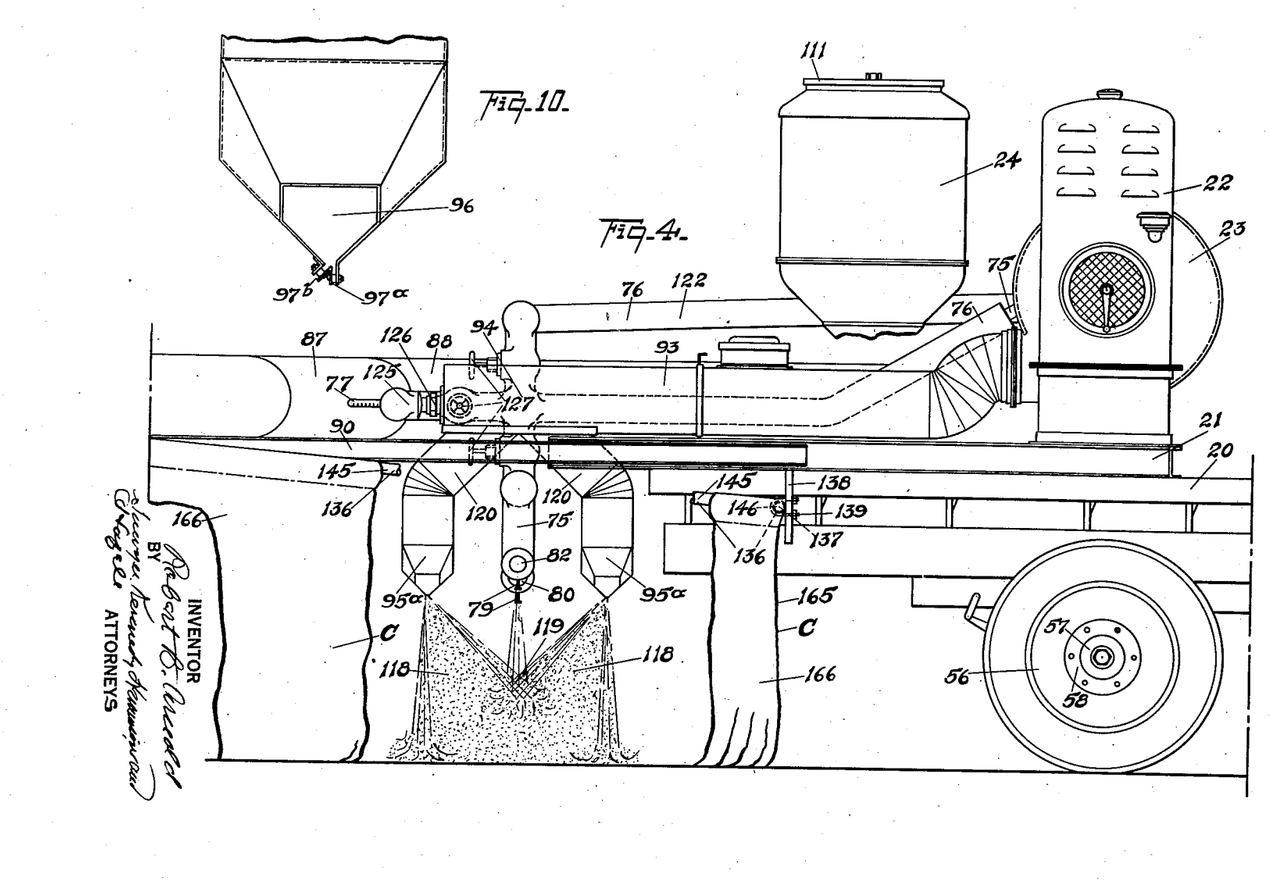
Figure 7:
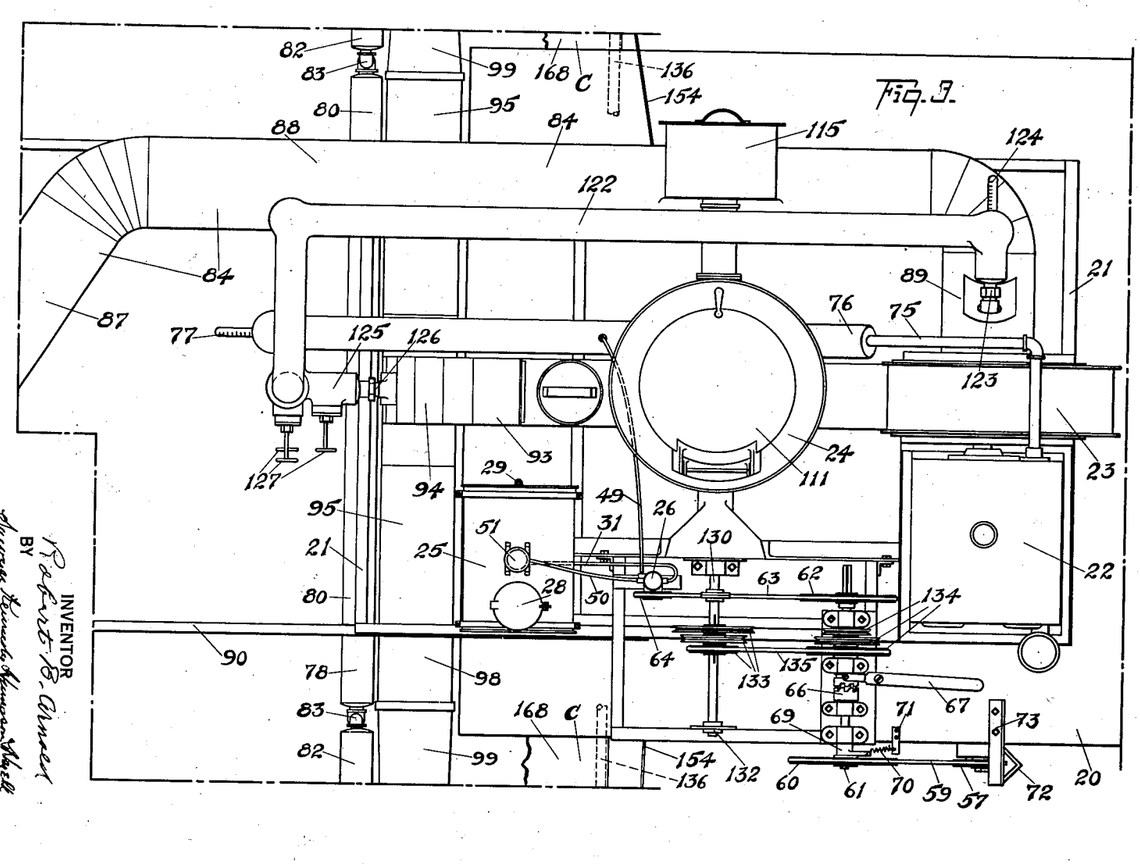

A modified arrangement for distributing the powder and combining it with the nicotine is disclosed in Fig. 4, in which two transverse distributors 95a, similar in construction to distributor 95, are located at opposite sides of and advantageously in alignment with the series of nozzles 79, and the outlet means from each distributor 95a is arranged to discharge the powder downwardly and inwardly into the path of nicotine from nozzles 79. The outlet means in this embodiment, illustrated in Fig. 10, is similar to those in Fig. 1 and comprises a downwardly directed branch 97a and an inwardly directed branch 97b, each branch consisting of a substantially continuous aperture passage or channel extending throughout the length of distributor 95a. The zone 118 of the dust discharge from outlets 97a and 97b and the zone 119 of the nicotine discharge from nozzles 79 are indicated diagrammatically in Fig. 4. Each distributor 95a is connected by an inwardly deflected central riser 120 to the rear end section 94 of feed pipe 93.

Under certain circumstances it is desirable to introduce the nicotine into the recirculation system, and when powder is employed to combine the nicotine and powder before discharge of the latter into the air. For this purpose suitable pipe connections from pipe 75 are provided, discharging into the recirculation return pipe 84, feed pipe 93, or both. In the illustrated arrangement a branch pipe 122 extends from pipe 75 beyond the point of introduction of nicotine and at a point where the nicotine has been vaporized, and discharges through a suitable connection 123 into the front section 89 of return pipe 84 adjacent the inlet to blower 23. A suitable thermometer 124 may be mounted on pipe 122 adjacent its discharge end to permit observation of the pipe temperature and adjustment thereof in the manner already indicated. Another branch pipe 125 extends from pipe 75 desirably to a point beyond where the nicotine has been introduced and has been substantially vaporized, and discharges through a suitable connection 126 into the feed system, preferably into the rear end section 94 above the connection to distributor 95. Valves 127 in branch pipes 122 and 125, and in pipe 75 beyond the points of connection of said branch pipes therewith, permit selective discharge of the nicotine to the recirculation feed pipe, the recirculation discharge pipe or the distributor pipe 78, as well as any desired proportional distribution of the nicotine to some or all of said points. The valve system likewise permits regulation of the pressure in pipe 75 in the zone of introduction and vaporization of the nicotine. Branch pipes 122 and 125 are of course provided with suitable thermal insulating jackets 76 to maintain the proper temperature for nicotine vaporization to the point of introduction of such vapor into the recirculating system.

A suitable temporary enclosure in the form of an apron or canopy covering the area undergoing treatment is mounted on the unit. For this purpose a suitable framework is provided, extending laterally from the unit to points beyond the ends of the distributing apparatus; and means for collapsing or withdrawing the portions of the frame projecting substantially beyond the sides of the truck body is advantageously provided. In the illustrated embodiment this framework comprises a generally rectangular frame 136 formed of iron piping and including a front bar 137 supported from the truck platform 20 by hangers 138 and U-bolts 139 encircling bar 137 and mounted in a vertical series of holes in hangers 138 at the desired distance from the ground. Rear bar 140 of frame 136 is similarly mounted by means of U-bolts 141 (Figs. 1a, 2) at an adjustable height by U-bolts 141 mounted in a series of holes 142 in vertical supports 143 carried by the rear cross beam 144 of extension frame 90. Side bars 145 connect the outer ends of bars 137 and 140 and are rigidly attached thereto.

A collapsible arrangement is provided by forming front bar 137 with a central section 146 engaged by bolts 139 and side sections 147 slidably mounted in section 146, rear bar 140 being similarly formed with a central section 148 engaged by U-bolts 141 and side sections 149 slidably mounted in the ends of section 148. The frame is designed for convenient construction from ordinary piping with the ends of bars 137 and 140 connected to side bars 145 by L's and the side sections 147, 149 slidably fitting in central sections 146, 148. The side and central sections are detachably held in operative position as by cotter pins 150 extending through the piping of the respective side and central sections at each point of connection.

Suitable means for supporting and bracing portions of the apparatus extending laterally beyond the truck, are provided. In the form described hanger rods 151 are detachably hooked at their ends through suitable eyes 152, mounted on the outer portions of rear bars 140, and through the upper parts of supports 143 located substantially above the level of the bar 140 to provide suitable vertical support. The inner ends of rods 151 are connected by a tension strap 153 engaging the upper parts of supports 143. Similar hanger rods 154 are detachably hooked at their ends through eyes 155 at the outer ends of front bars 137 and through suitable holes in flanges 156 of the frame 21, located substantially above the level of bar 137. The frame 136 is also reinforced against the drag of the canopy by brace rods 157 detachably engaging at their ends the end portions of front bar 137 and platform 20 at a point substantially in advance of bar 137. Rods 151, 154 and 157 are provided with suitable turn buckles 158 for convenience in providing accurate and adjustable tension. The portions of the distributing apparatus extending laterally beyond the truck unit may also be supported from frame 136. In the form illustrated, the outer ends of the lateral distributor pipe sections 82 and the lateral sections 99 of the powder distributor 95 are provided with hanger rods 162 hooked over support rod 159, which is mounted on front bar 137 by pivotal connection 160 and detachably held in place on side bar 145 by pin 161.

A suitable canopy C enclosing the area under treatment is mounted on frame 136, and is formed of air-tight flexible material such as woven fabric impregnated or coated with a suitable elastic composition, usually a rubber compound. The canopy C comprises a front wall 165 suspended from front bar 137, side walls 166 suspended from side bars 145, a rear wall 167 suspended from rear bar 140 and extending therefrom downwardly and rearwardly, and a top wall 168 extending continuously between bars 137, 140 and 145 except where the top wall is necessarily cut away for portions of the unit and supports extending through the wall. Front, side, rear and top walls are continuously connected or juxtaposed along contiguous edges to form a substantially closed canopy extending to the ground and may be weighted along their lower edges in known manner to maintain contact with the ground and plant growth thereon. The bars forming frame 136 may be located in suitable pockets 169 formed in the margins of the canopy walls.

Suitable means for directing and regulating the flow of the recirculating current of gas beneath canopy C is provided. This includes an arrangement for directing toward the plant growth the insecticidal material discharged beneath the canopy. For this purpose a transverse flexible baffle or apron 170 (Figs. 1*a*, 2*a*) is suspended from the top wall 168 of the canopy and extends transversely substantially across the space between side walls 166 and downwardly from the top wall 168 for a sufficient distance to force the rearwardly traveling current of fumigant into contact with the plant growth. Apron 170 may be made of material similar to the canopy C and is sufficiently flexible to be deflected rearwardly by engagement with such growth without danger to the same where necessary, being desirably provided with a flexible weight such as rope or chain 171 attached to the lower margin of apron 170 and of proper weight to maintain said margin in vertical position or in engagement with plants passing thereunder.

A suitable arrangement for preventing the canopy C from obstructing suction inlets 85 is provided. In the form illustrated frames 172 are adjustably mounted by pivot bolts on supports 173 carried by cross-beam 144 and are located at the rear of each inlet 85. The frames may be held in any desired angular position as indicated in Fig. 6, and may yield under abnormal pressure to avoid canopy rupture.

A modified arrangement is indicated in Fig. 13, and comprises an adaptation of the construction already described to the treatment of plant growth in a stationary enclosure. In the embodiment shown, a tree 175 is covered by a suitable canopy 176 which may be of material similar to that employed in canopy C. Canopy 176 completely encloses the tree and is closed at the bottom, as by holding the lower margin of the canopy tightly against the ground by stones 177. The discharge end of feed pipe 93 is connected to a flexible tube 178 discharging through the upper part of canopy 176. A flexible return tube 179 is connected at one end with the space beneath canopy 176 toward the lower part of the canopy and desirably below the lower branches of the tree in the form disclosed, the other end of tube 179 connecting with the return pipe 84 in advance of powder feed box 115. In this embodiment means is provided for feeding the dust and nicotine when the truck is stationary. A simple arrangement comprises a hand crank 180 on worm shaft 130.

The nicotine employed with the described system is advantageously as nearly anhydrous as can be obtained in commercial practice, and generally consists of from 94 to 99% nicotine, the remainder consisting of resinous and other non-aqueous impurities. It is desirable to employ a product containing approximately 98% nicotine and less than 1% water, since this material may be produced commercially without resort to chemical treatment.

The nicotine is desirably combined with a hydrocarbon of lower boiling point than the nicotine, facilitating observation of the otherwise transparent fumes and providing protection against decomposition of the nicotine, especially when gasified. Hydrocarbons suitable for this purpose, together with proportions and conditions of use, are set forth in Arnold Patent No. 2,120,225. The hydrocarbon is moreover combined also with the dusting powder, and serves to improve the effectiveness of the resulting composition, particularly serving to increase the adhesiveness of the powder to the plants and insects, and when the nicotine fumes are used without the powder, the use of hydrocarbons as indicated is of primary importance.

When hydrated lime is employed as the dusting powder, it should be of the fineness generally employed for such purposes and should contain as low an uncombined water content as is feasible in commercial practice, preferably less than 1%. The nicotine concentration beneath the canopy C may be that set forth in Arnold Patent No. 2,120,225, but may be substantially increased from the concentration set forth therein, owing to the more economical operation provided by the recirculation system. The amount of dust supplied to said space may likewise be substantially higher than that employed in ordinary dusting operations because of the recovery of excess dust through the recirculation system.

Many features of the method of operation of the construction shown in Figs. 1–12 will be apparent from the foregoing description. After assembling the unit with the canopy and distributors in position, the feeding mechanism can be operated at will through clutch handle 67. The rate of nicotine feed with relation to the distance traveled by the truck may be determined empirically by diverting the nicotine into gauge 51, and the rate of feed adjusted by suitably rotating pump cap 44. The preferred rate of powder feed may be selected by placing belt 135 on the appropriate pair of pulleys 133, 134. Temperatures in the nicotine gas feed lines may be observed from thermometers 77, 124, and adjusted by shifting the engine spark and by varying the pressure in said lines through manipulating valves 127, the latter likewise regulating the points at which the nicotine gas is introduced into the recirculating system.

When the unit is properly adjusted the nicotine fumes are discharged beneath the forward portion of canopy C and promptly envelop plant growth beneath the canopy. The fumes travel rearwardly in a current passing through and around the plant growth under apron 170 and thence to the rear of the space under canopy C. The gases and suspended material beneath the rear end of the canopy are drawn through suction inlets 85. This arrangement provides a certain amount of pressure adjacent the forward end of the canopy C, combating the tendency of the outer air to leak beneath the canopy as the unit travels forward, and also provides a reduced pressure toward the rear of the canopy, opposing the tendency of the gases and material suspended therein to pass outwardly beneath the trailing end of said canopy.

Where the arrangement is employed to feed the nicotine simultaneously with a powder which combines therewith, the relative proportions of powder and nicotine may be accurately regulated in the manner already indicated. It has been found that by applying the nicotine to the powder in the manner indicated a highly efficient nicotine dust is produced, with the nicotine uniformly incorporated therein in active condition. A suitable excess of nicotine beyond that taken up by the powder is provided without waste, since the fumes themselves are effective beneath canopy C while the nicotine carried by the powder continues its effectiveness after the canopy has passed and serves to complete the destruction of parasites which may have been materially affected but not killed during treatment beneath the canopy.

The described arrangement is capable of flexible operation to suit various types of treating materials, plant growth and fumigants. It may be operated to apply fumes alone by disconnecting belt 135, or to apply dust alone by disconnecting belt 63. It moreover constitutes an apparatus for charging a suitable dusting powder with a liquid or gaseous parasiticidal material, or for mixing such powder with appropriate liquid, vaporized or gaseous material immediately before application to the plant growth.

Figure 13:
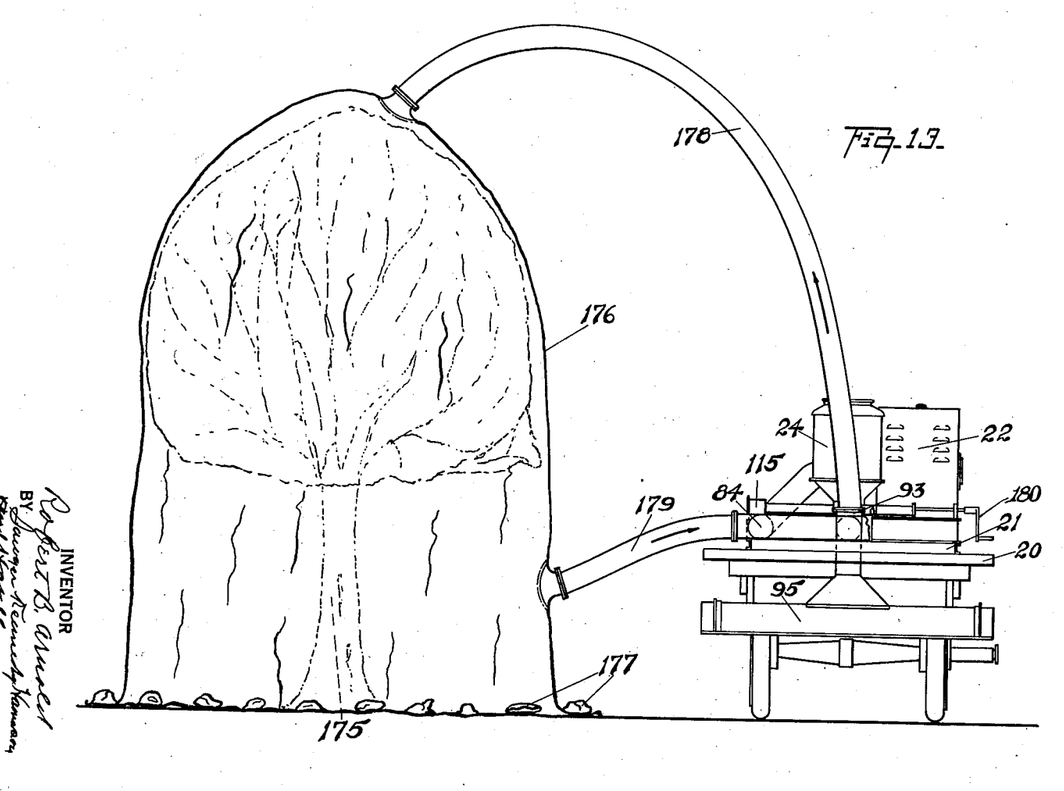

In the operation of the embodiment shown in Fig. 13, the current between the feed tube 178 and the return tube 179 beneath the canopy 176 is arranged to carry the fumigant through and around all portions of the tree or other plant growth; and the continuous recirculation permits not only the development of a high fumigant concentration in a relatively short period, but also assures adequate dusting of all surfaces where desired since a substantial excess of dust may be provided without waste. Although the form illustrated discloses the current of fumigant as passing downwardly through the tree, this showing is not intended to be restrictive, since the system is obviously adapted to the provision of a current passing through the plant growth in any desired path, including upward flow thereof. The feed mechanism may be operated when the truck is stationary by means of hand crank 180, though the truck motor may likewise be employed under proper conditions by jacking up wheel 56 so that it clears the ground. Either mode of operation may be used to feed either dust alone or nicotine and dust in the manner already described. In some cases the apparatus may be employed without a canopy, in which case, however, all the advantages of recirculation are lost, but substantially all other advantages are retained.

The invention is especially advantageous with gasified nicotine, but certain features are applicable to other methods of operation, especially when substances other than nicotine are employed.

While the invention has been more particularly described in connection with the application to the plants of a volatilizable parasiticide, or of such a parasiticide and a suitable carrier dust, it is also highly advantageous when a preformed or natural parasiticide dust such as powdered derris root is to be applied alone, in which case the apparatus for supplying the volatilizable parasiticide such as nicotine is put out of operation.

In such use of a parasiticidal dusting powder the dust distributors are particularly important during the travel of the apparatus as they ensure the complete covering of all parts of the plants, since each plant will be struck in two directions by two discharges of dust where only one distributor is used and by four discharges and from two angular directions as well as downward, when two distributors are used, as will be clear from Fig. 4 of the drawings. The work done with the apparatus in pea fields has shown that using derris powder only the kill of aphis has been better than previously obtained by other methods and apparatus.

While the preferred embodiment has been described, together with certain modifications, the invention is not limited thereto, since various modifications may be made within the limits of the invention as indicated by the claims.

What is claimed is:

1. The method of applying parasiticides to plants and the like, which comprises gasifying a volatilizable parasiticide, mixing it with exhaust gases, bringing the mixture into contact with a dusting powder suspended in gas, and applying the resultant parasiticidal powder to plants.

2. The method of applying parasiticides to plants and the like, which comprises gasifying a volatilizable parasiticide, mixing it with exhaust gases, bringing the mixture into contact with a hydrated lime dusting powder suspended in gas, and applying the resultant parasiticidal powder to plants.

3. The method of applying nicotine parasiticides which comprises gasifying a mixture of substantially anhydrous nicotine and a hydrocarbon protective against nicotine decomposition having a boiling point not materially higher than that of the nicotine, combining the nicotine and hydrocarbon fumes with a suspension of substantially anhydrous hydrated lime dusting powder in gas, and applying the resultant powder in suspension to plant growth.

4. The method of applying nicotine parasiticides which comprises suspending a dusting powder in gas, contacting nicotine with the powder in suspension, applying the suspended powder and nicotine to plant growth in an enclosure, withdrawing gas from the enclosures, suspending additional powder in the withdrawn gas, adding nicotine thereto and returning the gas carrying the suspended powder and nicotine to the point of application to plant growth.

5. The method of applying a parasiticide to field plants beneath a traveling enclosure, which comprises introducing the parasiticide finely disseminated in a gaseous fluid, beneath the forward portion of the enclosure and withdrawing gaseous fluid with any accompanying parasiticide from beneath the rearward portion of the enclosure.

6. The method of applying a parasiticide to field plants beneath a traveling enclosure, which comprises introducing the parasiticide finely disseminated in a gaseous fluid, beneath the forward portion of the enclosure, withdrawing gaseous fluid with any accompanying parasiticide from beneath the rearward portion of the enclosure, adding more parasiticide to the said withdrawn gaseous fluid and returning it to the forward portion of the enclosure during the travel of the enclosure.

7. The method of fumigation of plant growth with fumigant applied beneath a traveling enclosure which comprises introducing a gas containing a fumigant beneath the forward portion of the enclosure and withdrawing gas from the rearward portion of the enclosure during travel.

8. The method of fumigation of plant growth with fumigant applied beneath a traveling enclosure which comprises introducing a gas containing a fumigant beneath the forward portion of the enclosure, withdrawing gas from the rearward portion of the enclosure, adding fumigant to the withdrawn gas and returning said gas and fumigant beneath the forward portion of the enclosure during travel.

9. Fumigating apparatus arranged for mounting on a vehicle including in combination a dusting powder distributor and a nicotine fume distributor, each arranged to extend transversely at the rear of the vehicle, means on the vehicle for suspending the powder in a gas and feeding the suspension to the powder distributor, and means on the vehicle for gasifying the nicotine and feeding the resulting nicotine fumes to the nicotine distributor.

10. An apparatus for applying parasiticides to plants, comprising, in combination, an enclosure for the plants, means for introducing into the enclosure fumes of a volatilizable parasiticide and a dusting powder in suspension in a gaseous fluid, and a recirculating system including means for withdrawing gaseous fluid from the enclosure, with any parasiticidal material it may contain, means for supplying further parasiticidal material to said withdrawn gaseous fluid, and means for returning the said recharged gaseous fluid to the introducing means.

11. A fumigating apparatus comprising in combination an enclosure, means for introducing into the enclosure nicotine fumes and a gas suspension of a dusting powder coalesced with the nicotine, and a recirculation system including means for withdrawing gas from the enclosure, adding nicotine fumes and powder to the withdrawn gas and returning the gas to the introducing means.

12. Traveling fumigation apparatus comprising a traveling canopy enclosing the fumigation zone, and means for supplying fumigating material to the canopy enclosure including means for withdrawing gas from the rearward portion of the enclosure and returning the gas to the forward portion of the enclosure.

13. Traveling fumigation apparatus comprising a vehicle and fumigating equipment mounted on the vehicle, including a canopy enclosing a ground area at the rear of the vehicle, means for introducing nicotine fumes beneath the forward portion of the canopy adjacent the vehicle, and means for withdrawing gas from beneath the rear portion of the canopy and returning said gas beneath the forward portion of the canopy.

14. Dusting apparatus comprising means for suspending a plant dusting powder in a gas, means for feeding the suspended powder to the space within an enclosure, and means for withdrawing gas from the enclosure and supplying it to the powder suspending means.

15. Fumigating apparatus for the fumigation of horizontally extending plant growth comprising a canopy enclosing said growth and means for directing a gas current carrying fumigating material in a horizontal path in contact with said growth, comprising means for supplying gas and fumigating material to the canopy enclosure in a restricted zone, and means for withdrawing gas from the enclosure at a point horizontally spaced from the zone of gas supply and returning the withdrawn gas to the supply means.

16. Apparatus for the traveling fumigation of horizontally extending plant growth comprising a canopy enclosing a portion of the plant growth, supply means including means for directing a gas current containing fumigating material in a horizontal path in contact with said growth including means for supplying gas and fumigating material to the forward portion of the canopy enclosure and means for withdrawing gas from the rearward portion of said enclosure and returning the withdrawn gas to the supply means; and means for conveying the canopy and supply apparatus along the plant growth.

17. Fumigating apparatus comprising means for supplying gas carrying fumigating material in a restricted zone within an enclosure, means for withdrawing gas from the enclosure at a point spaced from the supply zone and returning the withdrawn gas to the supply means, and means for regulating the withdrawal of gas.

18. Fumigating apparatus comprising in combination a vehicle; a support on the vehicle; a fumigating unit mounted on the support including an internal combustion engine, a nicotine supply, a dusting powder supply, nicotine gasifying and feeding means including a distributor, an insulated engine exhaust pipe connected to the distributor, and means for introducing nicotine into the pipe; and a gas recirculation system including a blower, a return pipe connected to the blower inlet, a supply pipe connected to the blower inlet, a distributor into which the supply pipe discharges, located adjacent the nicotine distributor, and means for feeding dusting powder to the gas recirculation system.

ROBERT B. ARNOLD.